United States Patent
Kim et al.

(10) Patent No.: US 11,506,065 B1
(45) Date of Patent: Nov. 22, 2022

(54) AIRFOIL WITH SERPENTINE FIBER PLY LAYUP

(71) Applicant: RAYTHEON TECHNOLOGIES CORPORATION, Farmington, CT (US)

(72) Inventors: Russell Kim, Glastonbury, CT (US); Jonas S. Banhos, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/524,809

(22) Filed: Nov. 12, 2021

(51) Int. Cl.
*F01D 5/28* (2006.01)
*F02C 3/04* (2006.01)

(52) U.S. Cl.
CPC ............... *F01D 5/282* (2013.01); *F02C 3/04* (2013.01); *F05D 2220/32* (2013.01); *F05D 2230/50* (2013.01); *F05D 2300/603* (2013.01); *F05D 2300/614* (2013.01)

(58) Field of Classification Search
CPC ........ F01D 5/282; F02C 3/04; F05D 2220/32; F05D 2230/50; F05D 2300/603; F05D 2300/614
See application file for complete search history.

(56) References Cited

U.S. PATENT DOCUMENTS

| | | | |
|---|---|---|---|
| 8,038,408 B2 | 10/2011 | McMillan | |
| 2003/0059577 A1* | 3/2003 | Morrison | B32B 3/18 428/188 |
| 2005/0238491 A1* | 10/2005 | Morrison | F01D 5/187 416/229 R |
| 2014/0050893 A1* | 2/2014 | Paige | F01D 5/28 428/158 |
| 2016/0177743 A1* | 6/2016 | Thomas | F01D 5/284 29/889.71 |
| 2016/0258320 A1* | 9/2016 | Thomas | F01D 25/005 |
| 2020/0149423 A1* | 5/2020 | Farrar | F01D 5/282 |
| 2020/0232332 A1* | 7/2020 | Farrar | F01D 5/14 |
| 2021/0156266 A1* | 5/2021 | Farrar | F01D 9/041 |
| 2021/0189889 A1 | 6/2021 | Decesare et al. | |

* cited by examiner

*Primary Examiner* — Jesse S Bogue
(74) *Attorney, Agent, or Firm* — Carlson, Gaskey & Olds, P.C.

(57) ABSTRACT

An airfoil includes an airfoil section that is formed of a fiber-reinforced composite that has fiber plies. The fiber plies include at least one overwrap fiber ply, first and second support fiber plies, and a serpentine fiber ply. The overwrap fiber ply circumscribes an internal cavity and defines first and second sides and leading and trailing ends of the airfoil section. The first and second support fiber plies define respective first and second radial tubes in the internal cavity. The serpentine fiber ply winds from the first side and around the first radial tube to the second side, then from the second side back to the first side, and then from the first side and around the second radial tube back to the second side.

20 Claims, 3 Drawing Sheets

AIRFOIL WITH SERPENTINE FIBER PLY LAYUP

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section formed of a fiber-reinforced composite comprised of fiber plies. The fiber plies include at least one overwrap fiber ply that defines first and second sides and leading and trailing ends of the airfoil section, the at least one overwrap fiber ply circumscribing an internal cavity, first and second support fiber plies defining respective first and second radial tubes in the internal cavity, and a serpentine fiber ply that winds i) from the first side and around the first radial tube to the second side, ii) then from the second side back to the first side, and iii) then from the first side and around the second radial tube back to the second side.

In a further embodiment of the foregoing embodiment, the serpentine fiber ply is in contact with the first and second sides of the at least one overwrap ply.

In a further embodiment of any of the foregoing embodiments, the serpentine fiber ply is in contact with the first side at first and second chord-length locations that are separated by a first non-contact region where the serpentine fiber ply does not contact the first side.

In a further embodiment of any of the foregoing embodiments, the serpentine fiber ply is in contact with the second side at third and fourth chord-length locations that are separated by a second non-contact region where the serpentine fiber ply does not contact the second side.

In a further embodiment of any of the foregoing embodiments, the serpentine fiber ply is in contact with the first and second radial tubes.

In a further embodiment of any of the foregoing embodiments, the serpentine fiber ply includes a first section that is in contact with the first and second sides of the at least one overwrap fiber ply and is in contact with the first radial tube, and the first section wraps at least 360 degrees around the first radial tube.

In a further embodiment of any of the foregoing embodiments, the serpentine fiber ply includes a second section that is in contact with the first and second sides of the at least one overwrap fiber ply, and the second section is in contact with the second radial tube.

In a further embodiment of any of the foregoing embodiments, the serpentine fiber ply includes a first section that is in contact with the first and second sides of the at least one overwrap fiber ply, and the first section wraps around the first radial tube and overlaps itself.

A gas turbine engine according to an example of the present disclosure includes a compressor section, a combustor in fluid communication with the compressor section, and a turbine section in fluid communication with the combustor. At least one of the turbine section or the compressor section has airfoils disposed about a central axis of the gas turbine engine. Each of the airfoils includes an airfoil section formed of a fiber-reinforced composite comprised of fiber plies. The fiber plies include at least one overwrap fiber ply that defines first and second sides and leading and trailing ends of the airfoil section, the at least one overwrap fiber ply circumscribing an internal cavity, first and second support fiber plies defining respective first and second radial tubes in the internal cavity, and a serpentine fiber ply that winds i) from the first side and around the first radial tube to the second side, ii) then from the second side back to the first side, and iii) then from the first side and around the second radial tube back to the second side.

In a further embodiment of any of the foregoing embodiments, the serpentine fiber ply is in contact with the first and second sides of the at least one overwrap ply.

In a further embodiment of any of the foregoing embodiments, the serpentine fiber ply is in contact with the first side at first and second chord-length locations that are separated by a first non-contact region where the serpentine fiber ply does not contact the first side, and the serpentine fiber ply is in contact with the second side at third and fourth chord-length locations that are separated by a second non-contact region where the serpentine fiber ply does not contact the second side.

In a further embodiment of any of the foregoing embodiments, the serpentine fiber ply is in contact with the first and second radial tubes.

In a further embodiment of any of the foregoing embodiments, the serpentine fiber ply includes a first section that is in contact with the first and second sides of the at least one overwrap fiber ply and is in contact with the first radial tube, and the first section wraps at least 360 degrees around the first radial tube.

In a further embodiment of any of the foregoing embodiments, the serpentine fiber ply includes a second section that is in contact with the first and second sides of the at least one overwrap fiber ply, and the second section is in contact with the second radial tube.

In a further embodiment of any of the foregoing embodiments, the serpentine fiber ply includes a first section that is in contact with the first and second sides of the at least one overwrap fiber ply, and the first section wraps around the first radial tube and overlaps itself.

A method for fabricating an airfoil according to an example of the present disclosure includes forming an airfoil section of the airfoil from a fiber-reinforced composite comprised of fiber plies that include first and second support fiber plies, a serpentine fiber ply, and at least one overlap fiber play by: arranging the first and second support fiber plies around prongs of a forked mandrel to form respective first and second radial tubes, arranging the serpentine fiber ply to wind around the first and second radial tubes, and arranging the at least one overwrap fiber ply around the first and second support fiber plies and the serpentine fiber ply to define first and second sides of the airfoil section, leading and trailing ends of the airfoil section, and an internal cavity in the airfoil section, such that the serpentine fiber ply winds i) from the first side and around the first radial tube to the second side, ii) then from the second side back to the first side, and iii) then from the first side and around the second radial tube back to the second side.

In a further embodiment of any of the foregoing embodiments, the serpentine fiber ply is in contact with the first and second sides of the at least one overwrap ply.

In a further embodiment of any of the foregoing embodiments, the serpentine fiber ply is in contact with the first side at first and second chord-length locations that are separated by a first non-contact region where the serpentine fiber ply does not contact the first side, and the serpentine fiber ply is in contact with the second side at third and fourth chord-length locations that are separated by a second non-contact region where the serpentine fiber ply does not contact the second side.

In a further embodiment of any of the foregoing embodiments, the serpentine fiber ply includes a first section that is in contact with the first and second sides of the at least one overwrap fiber ply and is in contact with the first radial tube, and the first section wraps at least 360 degrees around the first radial tube.

In a further embodiment of any of the foregoing embodiments, the serpentine fiber ply includes a first section that is in contact with the first and second sides of the at least one overwrap fiber ply, and the first section wraps around the first radial tube and overlaps itself.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
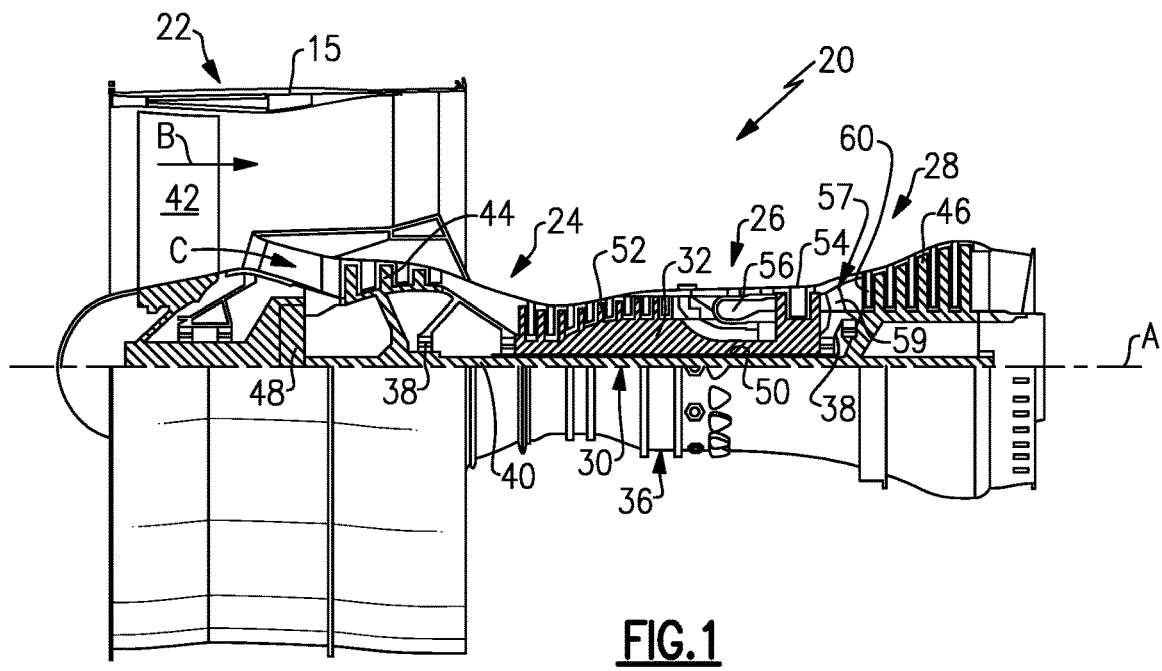
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
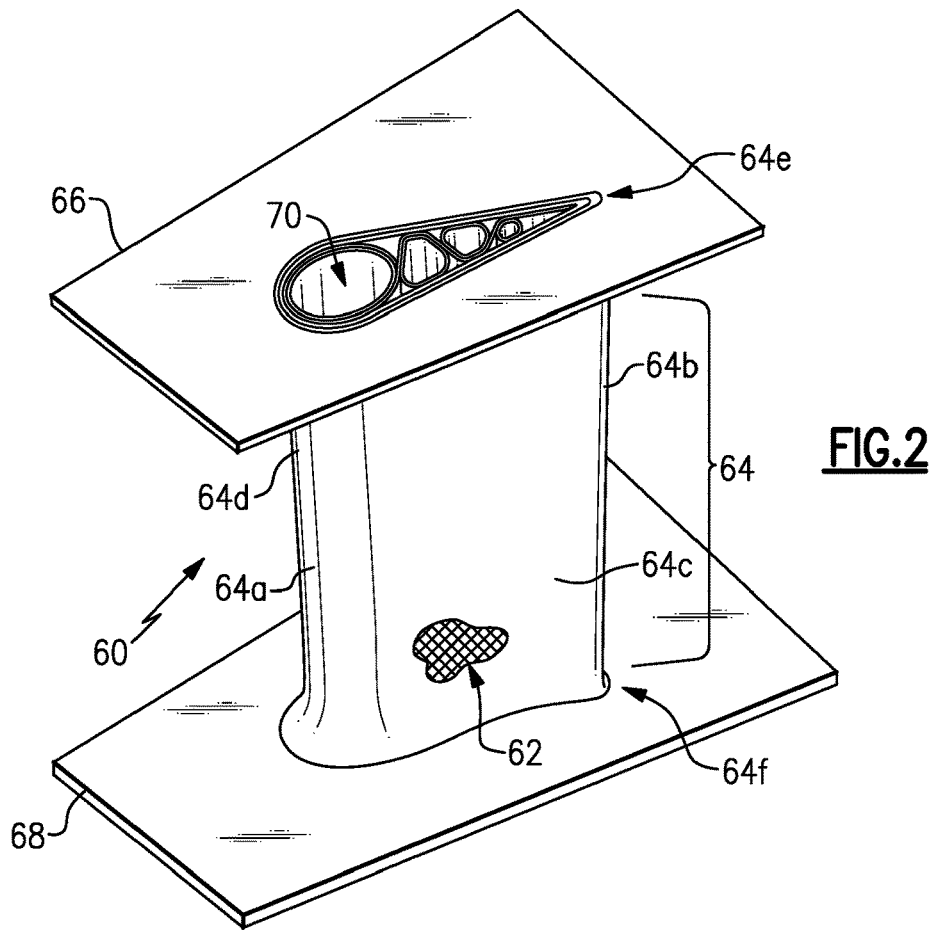
FIG. 2 illustrates an airfoil from the gas turbine engine.

FIG. 2 illustrates an isometric view of an example airfoil 60 from the turbine section 28 of the engine 20 (see also FIG. 1). For instance, the airfoil 60 is supported between inner and outer support hardware and there are multiple airfoils 60 arranged in a circumferential row in the engine 20. It is to be understood that although the examples herein may be shown in context of a vane from the turbine section 28, the examples can be applied to turbine blades or other types of airfoils in other portions of the engine 20.

The airfoil 60 is formed of a fiber-reinforced composite 62 (shown in partial cutaway view). For example, the fiber-reinforced composite 62 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

In the illustrated example, the airfoil 60 is comprised of an airfoil section 64 and first and second platforms 66/68 between which the airfoil section 64 extends. The airfoil section 64 circumscribes an internal cavity 70 and defines leading and trailing ends 64a/64b and first and second sides 64c/64d that join the leading and trailing ends 64a/64b. There is a chord-line (CL) from the leading end 64a to the trailing end 64b. In this example, the first side 64c is a pressure side and the second side 64d is a suction side. The airfoil section 64 spans radially, relative to the central engine axis A, between a first (outer) radial end 64e to a second (inner) radial end 64f. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

Figure 3:
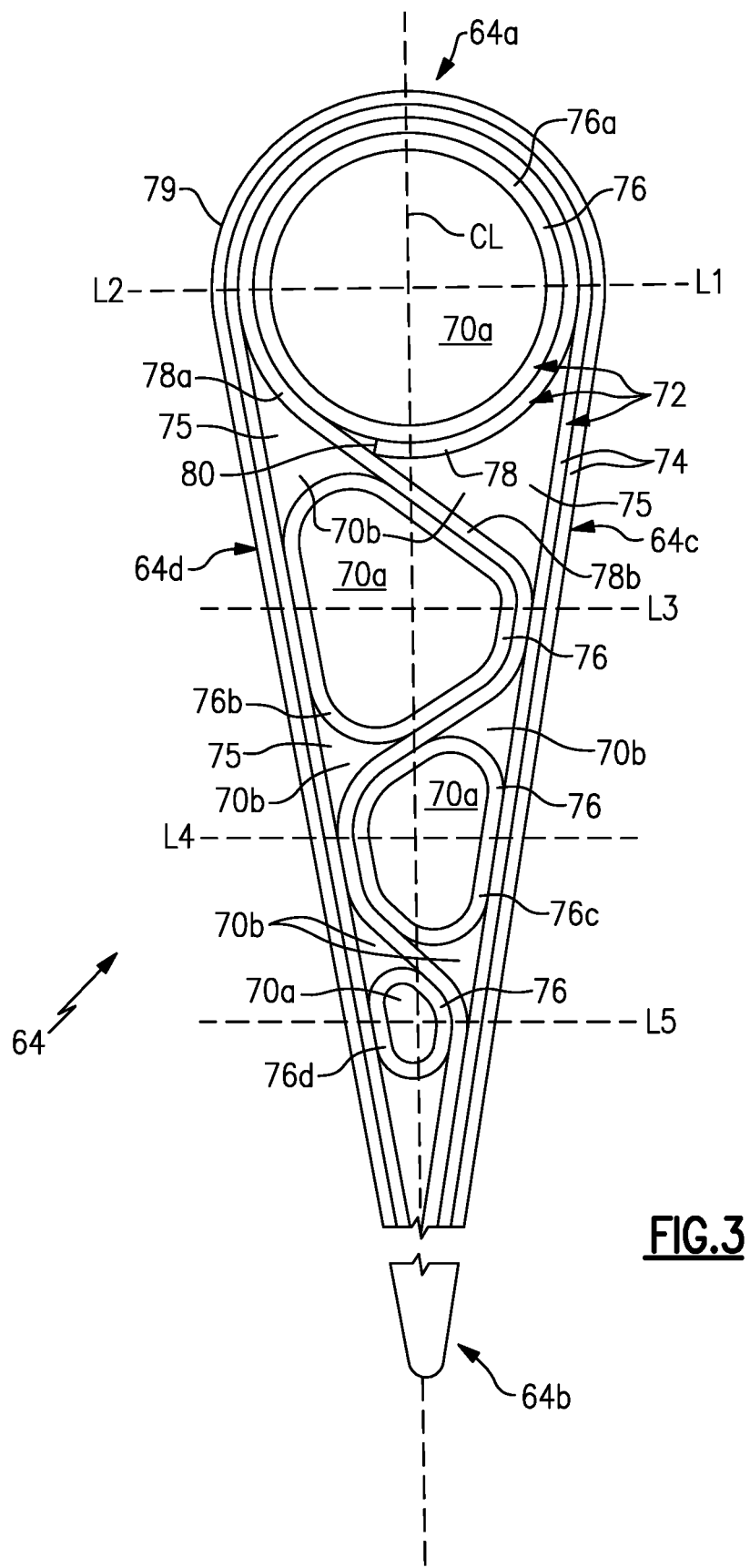
FIG. 3 illustrates a sectioned view of the airfoil.

FIG. 3 shows a sectioned view of the airfoil section 64. The aforementioned fiber-reinforced composite 62 is comprised of fiber plies 72. The fiber tows of the fiber plies 72 are arranged in a fiber architecture, which refers to an ordered arrangement of the tows relative to one another. For example, the fiber plies 72 are 2D woven plies, such as but not limited to, harness satin weave plies (e.g., 8 harness satin weave) or braided plies (e.g., bi- or tri-axial braid).

The fiber plies 72 include at least one overwrap fiber ply 74, support fiber plies 76, and a serpentine fiber ply 78. In the example shown, there are two overwrap fiber plies 74 in a multi-layer arrangement, although a single ply 74 or additional plies 74 could be used. The overwrap fiber ply or plies 74 circumscribe(s) the cavity 70 and define(s) the profile of the airfoil section 64, including the leading and trailing ends 64a/64b and the first and second sides 64c/64d. The exterior surface of the outer-most overwrap fiber ply 74 may be provided with a coating 79, such as an environmental barrier coating (EBC). Example EBCs are not particularly limited and may include, but are not limited to, single or multi-layer coatings containing a silicon-containing matrix, such as a silica ($SiO_2$) matrix, with silicon oxycarbide particles and barium-magnesium aluminosilicate particles dispersed in the silicon-containing matrix, and single or multi-layer coatings containing zirconia ($ZrO_2$), hafnia ($HfO_2$), hafnium silicate, zirconium silicate, rare earth silicates, rare earth oxides, mullite, silica ($SiO_2$), aluminum oxide, or combinations thereof.

The support fiber plies 76 define radial tubes in the internal cavity 70, which are designated at 76a/76b/76c/76d (i.e. sequentially from fore to aft, first, second, third, and fourth). It is to be noted, however, that for purposes of this disclosure any two consecutive ones of the tubes 76a/76b/76c/76d from fore-to-aft or aft-to-fore can be considered to be first and second tubes. The tubes 76a/76b/76c/76d extend substantially the full radial length of the airfoil section 64 from the first end 64e to the second end 64f. In this example, there are four tubes 76a/76b/76c/76d, but it is to be understood that additional tubes could be used, or as few as two tubes could be used. Each tube 76a/76b/76c/76d is formed from a single fiber ply 72 but could alternatively be formed with additional fiber plies 72 in a multi-layer arrangement.

The serpentine fiber ply 78, as its name suggests, winds back and forth in the cavity 70. As shown, the serpentine fiber ply 78 winds from the first side 64c and around the first radial tube 76a to the second side 64d. The serpentine fiber ply 78 then winds from the second side 64d back to the first side 64c, and then from the first side 64c and around the second radial tube 76b back to the second side 64d.

In this regard, the serpentine fiber ply 78 defines at least several sections, including a first section 78a and a second section 78b. The first section 78a starts at ply edge 80 and is in contact at chord-location L1 with the portion of the overwrap fiber ply 74 that forms the first side 64c. The "chord-location" is the position along the chord CL and can be taken relative to the leading end 64a, trailing end 64b, or other reference. The first section 78a wraps around the first radial tube 76a and is also in contact at chord-location L2 with the portion of the overwrap fiber ply 74 that forms the second side 64d. Here, the chord-location L2 coincides with chord-location L1, however, in other examples where the airfoil has a great camber these chord-location L2 may differ from L1.

The first section 78a is also in continuous interfacial contact with the first tube 76a over nearly its full periphery from the ply edge 80 to a location that is at least 330 degrees around the tube 76a, at which the first section 78a departs from the tube 76a and overlaps itself at the ply edge 80. In total, with the overlap the first section 78a thus wraps at least 360 degrees around the first tube 76a. The contact and full wrapping facilitates the reinforcement of the serpentine fiber ply 78 by the relatively stiff structure of the tube 76a.

Just past the overlap, the serpentine fiber ply 78 comes into contact with the second tube 76b, which demarks the start of a second section of the ply 78. The second section 78b wraps around the second radial tube 76b and is in contact at chord-location L3 with another portion of the overwrap fiber ply 74 that forms the first side 64c and is in contact at chord-location L4 with another portion of the overwrap fiber ply 74 that forms the second side 64d. The second section 78b is in continuous interfacial contact with the second tube 78b over an extent from the initial point of contact that is forward of the location L3 to an end point of contact that is aft of the location L3. In between locations L1 and L3 and in between locations L2 and L4 there are non-contact regions 75 where the serpentine fiber ply 78 is not in contact with the overwrap fiber ply 74. Thus, the serpentine fiber ply 78 contacts the overwrap fiber ply 74 at multiple, spaced-apart locations.

In this example, the serpentine fiber ply 78 also again winds back around the fourth tube 76d and into contact at chord-location L5 with another portion of the overwrap fiber ply 74 that forms the first side 64c. The serpentine fiber layer 78 and overwrap layer(s) 74 then terminate aft of the aft-most tube (which in this example is the tube 76d).

The arrangement of the tubes 76a/76b/76c/76d and serpentine fiber ply 78 in the cavity 70 defines sub-passages 70a/70b. The sub-passages 70a are bound in the airfoil section 64 solely by the tubes 76a/76b/76c/76d, while the sub-passages 70b are bound by the serpentine fiber ply 78, the overwrap fiber ply 74, and one of the tubes 76, although one of the sub-passages in the illustrated example (on the upper right-hand side in the figure) is bound by only the serpentine fiber ply 78 and the overwrap fiber ply 74. Cooling air, such as relatively cool bleed air from the compressor section 24, may be provided into one or more of the sub-passages 70a/70b to cool the airfoil section 64. For instance, the cooling air may be provided as a single-pass radial flow through the sub-passages 70a/70b or as a multi-pass flow through one sub-passage 70a/70b to the next (i.e., a serpentine flow).

In general, airfoils that are formed of fiber-reinforced composites may include one or more internal ribs that bridge the pressure and suction side walls. These ribs reinforce the airfoil and thereby increase load capacity. However, it has now been discovered that there may be a performance trade-off in that under thermal and/or pressure loading the ribs may contribute to elevated compressive stresses in localized exterior surface regions of the airfoil. In particular, such compressive stresses may cause distress in exterior coatings, such as environmental barrier coatings. In this regard, the serpentine fiber ply 78 and the tubes formed by the support fiber plies 76 serve to increase the number of rib-like support features for reinforcement in the airfoil 60 and thereby distribute the stress over a wider area. In turn, the distribution of the stress facilitates reductions in localized peak stress, which may thus facilitate enhanced durability of exterior coatings.

Figure 4:
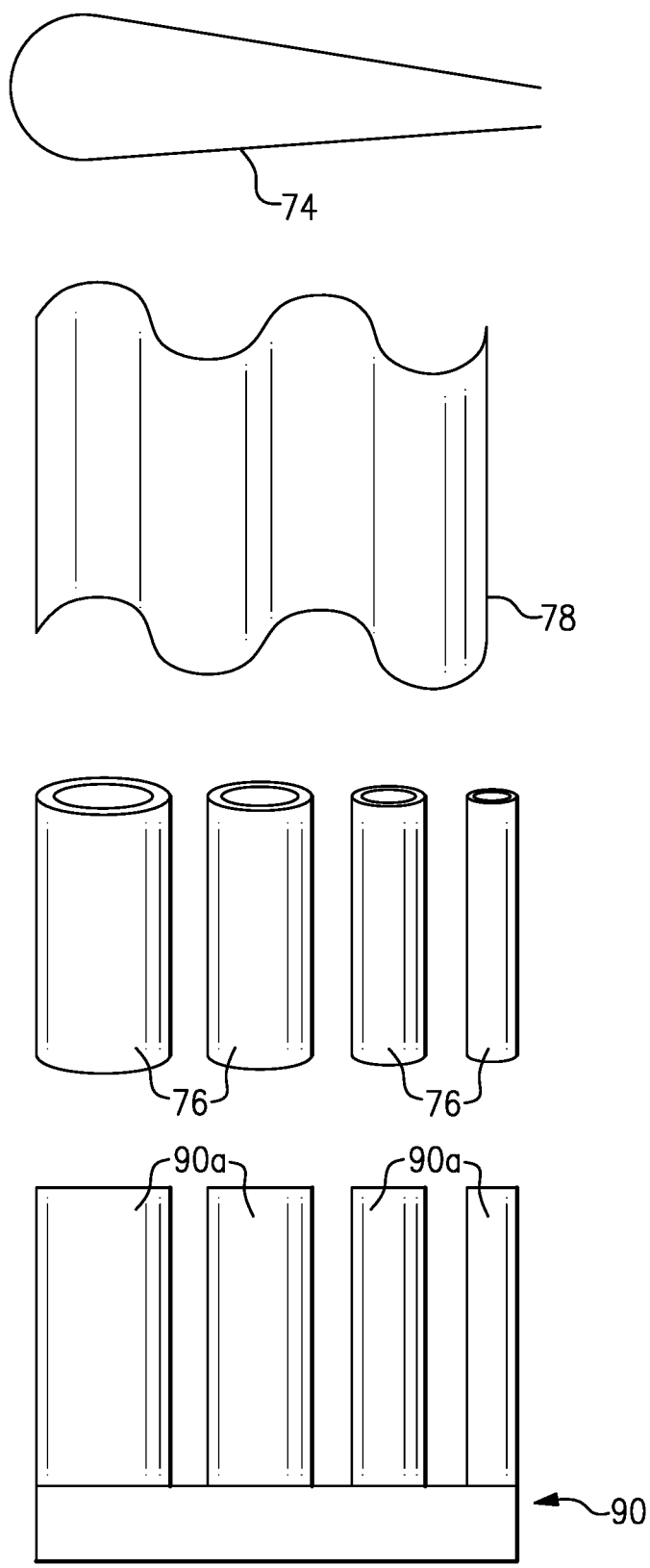
FIG. 4 illustrates a method of fabricating an airfoil.

FIG. 4 illustrates an example method for fabricating the airfoil 60. In general, the method is a fiber ply lay-up process. A forked mandrel 90 is provided that includes prongs 90a. As will be appreciated, the prongs are shown representatively and in practice will be designed in accordance with the end-use geometry of the airfoil 60. The support plies 76 may initially be sheets that are then wrapped around the prongs 90a to form the tubes 76a/76b/76c/76d. Alternatively, the support plies 76 may be provided preformed as tubes and then fitted over the prongs 90a. The serpentine fiber ply 78 is then wrapped around the support plies 76 on the prongs 90a and into the desired geometry in the end-use airfoil 60. If one or more of the sub-passages 70b are not required for cooling, the space may be filled with a filler material. After arranging the serpentine fiber ply 78, the overwrap ply 74 is wrapped around the serpentine fiber ply 78 and the support plies 76 to form the profile of the airfoil section 64. If the airfoil 60 is to include the platforms 66/68, the ends of the overwrap fiber ply 74 may be turned outwards to form the platforms 66/68. The forked mandrel 90 provides a substrate for the lay-up of the fiber plies 72 to form the airfoil 60. Additional prongs 90a may be provided to facilitate formation of the sub-cavities 70b if space permits.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section formed of a fiber-reinforced composite comprised of fiber plies, the fiber plies including
at least one overwrap fiber ply that defines first and second sides and leading and trailing ends of the airfoil section, the at least one overwrap fiber ply circumscribing an internal cavity,
first and second support fiber plies defining respective first and second radial tubes in the internal cavity, and
a serpentine fiber ply that winds i) from the first side and around the first radial tube to the second side, ii) then from the second side back to the first side, and iii) then from the first side and around the second radial tube back to the second side.

2. The airfoil as recited in claim 1, wherein the serpentine fiber ply is in contact with the first and second sides of the at least one overwrap ply.

3. The airfoil as recited in claim 1, wherein the serpentine fiber ply is in contact with the first side at first and second chord-length locations that are separated by a first non-contact region where the serpentine fiber ply does not contact the first side.

4. The airfoil as recited in claim 3, wherein the serpentine fiber ply is in contact with the second side at third and fourth chord-length locations that are separated by a second non-contact region where the serpentine fiber ply does not contact the second side.

5. The airfoil as recited in claim 4, wherein the serpentine fiber ply is in contact with the first and second radial tubes.

6. The airfoil as recited in claim 1, wherein the serpentine fiber ply includes a first section that is in contact with the first and second sides of the at least one overwrap fiber ply and is in contact with the first radial tube, and the first section wraps at least 360 degrees around the first radial tube.

7. The airfoil as recited in claim 6, wherein the serpentine fiber ply includes a second section that is in contact with the first and second sides of the at least one overwrap fiber ply, and the second section is in contact with the second radial tube.

8. The airfoil as recited in claim 1, wherein the serpentine fiber ply includes a first section that is in contact with the first and second sides of the at least one overwrap fiber ply, and the first section wraps around the first radial tube and overlaps itself.

9. A gas turbine engine comprising:
a compressor section;
a combustor in fluid communication with the compressor section; and
a turbine section in fluid communication with the combustor, at least one of the turbine section or the compressor section having airfoils disposed about a central axis of the gas turbine engine, each of the airfoils includes:
an airfoil section formed of a fiber-reinforced composite comprised of fiber plies, the fiber plies including at least one overwrap fiber ply that defines first and second sides and leading and trailing ends of the airfoil section, the at least one overwrap fiber ply circumscribing an internal cavity,
first and second support fiber plies defining respective first and second radial tubes in the internal cavity, and
a serpentine fiber ply that winds i) from the first side and around the first radial tube to the second side, ii) then from the second side back to the first side, and iii) then from the first side and around the second radial tube back to the second side.

10. The gas turbine engine as recited in claim 9, wherein the serpentine fiber ply is in contact with the first and second sides of the at least one overwrap ply.

11. The gas turbine engine as recited in claim 9, wherein the serpentine fiber ply is in contact with the first side at first and second chord-length locations that are separated by a first non-contact region where the serpentine fiber ply does not contact the first side, and the serpentine fiber ply is in contact with the second side at third and fourth chord-length locations that are separated by a second non-contact region where the serpentine fiber ply does not contact the second side.

12. The gas turbine engine as recited in claim 11, wherein the serpentine fiber ply is in contact with the first and second radial tubes.

13. The gas turbine engine as recited in claim 9, wherein the serpentine fiber ply includes a first section that is in contact with the first and second sides of the at least one overwrap fiber ply and is in contact with the first radial tube, and the first section wraps at least 360 degrees around the first radial tube.

14. The gas turbine engine as recited in claim 13, wherein the serpentine fiber ply includes a second section that is in contact with the first and second sides of the at least one overwrap fiber ply, and the second section is in contact with the second radial tube.

15. The gas turbine engine as recited in claim 9, wherein the serpentine fiber ply includes a first section that is in contact with the first and second sides of the at least one overwrap fiber ply, and the first section wraps around the first radial tube and overlaps itself.

16. A method for fabricating an airfoil, the method comprising:
forming an airfoil section of the airfoil from a fiber-reinforced composite comprised of fiber plies that include first and second support fiber plies, a serpentine fiber ply, and at least one overlap fiber play by
arranging the first and second support fiber plies around prongs of a forked mandrel to form respective first and second radial tubes,
arranging the serpentine fiber ply to wind around the first and second radial tubes,
arranging the at least one overwrap fiber ply around the first and second support fiber plies and the serpentine fiber ply to define first and second sides of the airfoil section, leading and trailing ends of the airfoil section, and an internal cavity in the airfoil section, such that the serpentine fiber ply winds i) from the first side and around the first radial tube to the second side, ii) then from the second side back to the first side, and iii) then from the first side and around the second radial tube back to the second side.

17. The method as recited in claim 16, wherein the serpentine fiber ply is in contact with the first and second sides of the at least one overwrap ply.

18. The method as recited in claim 16, wherein the serpentine fiber ply is in contact with the first side at first and second chord-length locations that are separated by a first non-contact region where the serpentine fiber ply does not contact the first side, and the serpentine fiber ply is in contact with the second side at third and fourth chord-length locations that are separated by a second non-contact region where the serpentine fiber ply does not contact the second side.

19. The method as recited in claim 16, wherein the serpentine fiber ply includes a first section that is in contact with the first and second sides of the at least one overwrap fiber ply and is in contact with the first radial tube, and the first section wraps at least 360 degrees around the first radial tube.

20. The method as recited in claim 16, wherein the serpentine fiber ply includes a first section that is in contact with the first and second sides of the at least one overwrap fiber ply, and the first section wraps around the first radial tube and overlaps itself.

* * * * *